(12) United States Patent
Tamura

(10) Patent No.: US 12,111,465 B2
(45) Date of Patent: Oct. 8, 2024

(54) DISPLAY DEVICE

(71) Applicant: 3M INNOVATIVE PROPERTIES COMPANY, St. Paul, MN (US)

(72) Inventor: Kentaro Tamura, Kanagawa (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 476 days.

(21) Appl. No.: 17/594,508

(22) PCT Filed: May 22, 2020

(86) PCT No.: PCT/IB2020/054900
§ 371 (c)(1),
(2) Date: Oct. 20, 2021

(87) PCT Pub. No.: WO2020/240386
PCT Pub. Date: Dec. 3, 2020

(65) Prior Publication Data
US 2022/0206197 A1    Jun. 30, 2022

(30) Foreign Application Priority Data

May 29, 2019   (CN) .......................... 201920794921.8

(51) Int. Cl.
*G02B 27/01*     (2006.01)
*B60K 35/00*    (2006.01)
(Continued)

(52) U.S. Cl.
CPC .......... *G02B 27/0101* (2013.01); *B60K 35/00* (2013.01); *G02B 5/208* (2013.01);
(Continued)

(58) Field of Classification Search
CPC ........ G02B 27/0101; G02B 2027/0118; B60K 35/23
See application file for complete search history.

(56) References Cited

U.S. PATENT DOCUMENTS 9,638,918 B2 *  5/2017  Uehara ................... G02B 5/208
10,061,187 B2 *  8/2018  Ichihashi ............... G03B 21/16
(Continued)

FOREIGN PATENT DOCUMENTS

JP      11023997      1/1999
JP     2015114571     6/2015
(Continued)

OTHER PUBLICATIONS

International Search Report for PCT International Application No. PCT/IB2020/054900, mailed on Aug. 4, 2020, 4 pages.

*Primary Examiner* — Bao-Luan Q Le
(74) *Attorney, Agent, or Firm* — Robert S. Moshrefzadeh

(57) ABSTRACT

The present application provides a display device that easily reduces an incident amount of an infrared light to a display portion on the basis of maintaining visual confirmation of display information. A display device according to one scheme of the present disclosure comprises: a display portion emitting a visible light of a linearly polarized wave having display information; an infrared light cut-off portion transmitting the visible light from the display portion and reducing an incident amount of an infrared light to the display portion; and a reflecting portion reflecting the visible light transmitted from the infrared light cut-off portion, wherein the infrared light cut-off portion comprises an infrared light cut-off layer, the infrared light cut-off layer has a slow axis, and the slow axis is generally parallel to a vibration direction of the linearly polarized wave.

9 Claims, 9 Drawing Sheets

(51) Int. Cl.
*G02B 5/20* (2006.01)
*B60K 35/23* (2024.01)
*B60K 35/60* (2024.01)

(52) U.S. Cl.
CPC .............. *B60K 35/23* (2024.01); *B60K 35/60* (2024.01); *B60K 2360/23* (2024.01); *B60K 2360/785* (2024.01); *G02B 2027/0118* (2013.01)

(56) References Cited

U.S. PATENT DOCUMENTS

| | | | |
|---|---|---|---|
| 10,890,763 B2* | 1/2021 | Hirata | G02B 27/286 |
| 11,054,640 B2* | 7/2021 | Takase | G02B 27/0101 |
| 11,287,652 B2* | 3/2022 | Habermehl | B60K 35/28 |
| 11,571,952 B2* | 2/2023 | Sugiyama | G02B 27/0172 |
| 11,921,287 B2* | 3/2024 | Yamamoto | G02B 27/286 |
| 2014/0177040 A1* | 6/2014 | Uehara | G02B 5/208 |
| | | | 359/352 |
| 2015/0185383 A1 | 7/2015 | Katoh | |
| 2016/0357096 A1* | 12/2016 | Ichihashi | G03B 21/28 |
| 2017/0277023 A1 | 9/2017 | Ishimatsu | |
| 2019/0041638 A1 | 2/2019 | Ono et al. | |
| 2019/0129172 A1 | 5/2019 | Misawa | |
| 2019/0265470 A1* | 8/2019 | Takase | G02B 5/003 |
| 2019/0346676 A1* | 11/2019 | Hirata | H04N 9/3179 |
| 2020/0189363 A1* | 6/2020 | Sugiyama | B60K 35/00 |
| 2020/0201037 A1* | 6/2020 | Yamamoto | G02B 27/0101 |
| 2021/0096365 A1* | 4/2021 | Habermehl | G02B 6/0078 |

FOREIGN PATENT DOCUMENTS

| | | |
|---|---|---|
| JP | 2016017152 | 2/2016 |
| JP | 2017116882 | 6/2017 |
| JP | 2019061241 A | 4/2019 |
| WO | WO 2010-137192 | 12/2010 |
| WO | WO 2017-136272 | 8/2017 |
| WO | WO 2018-092720 | 5/2018 |
| WO | WO 2018-168726 | 9/2018 |
| WO | WO 2019-025923 | 2/2019 |
| WO | 2019088291 A1 | 12/2020 |

* cited by examiner

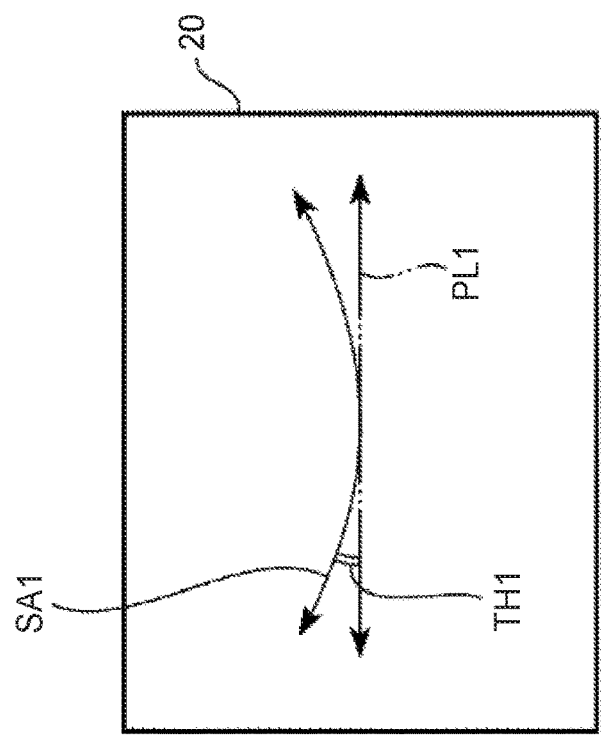
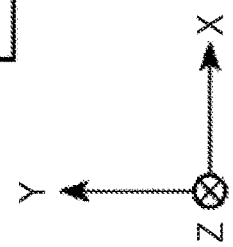
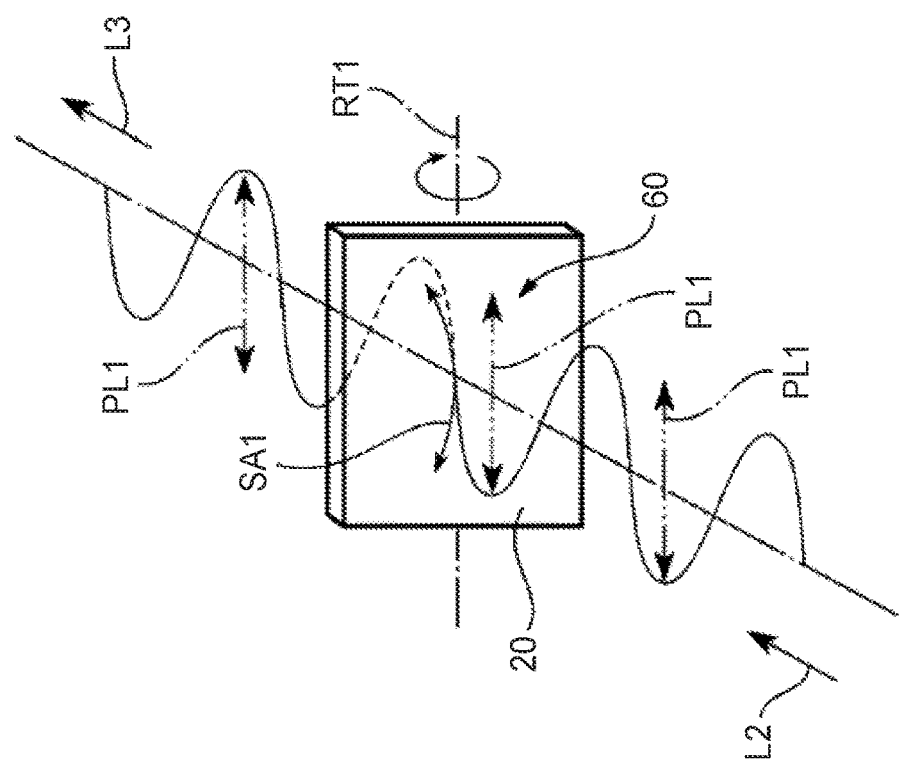
FIG. 6A
FIG. 6B

DISPLAY DEVICE

TECHNICAL FIELD

The present disclosure relates to a display device.

BACKGROUND

In a vehicle head-up display as one of display devices, for example, a liquid crystal panel having display information is disposed inside an instrument board in a car, and light from a backlight and transmitted from the liquid crystal panel is emitted towards a front windshield by a mirror. The emitted light is incident to eyes of a driver after reflected by the front windshield, and the driver can visually confirm display information from the liquid crystal panel with a virtual image. Furthermore, in a vehicle, it is important to reduce the influence of thermal energy caused by infrared rays (infrared light) in an external light (sunlight) on the liquid crystal panel. Therefore, in Patent Document 1, a vehicle head-up display is disclosed, in which an optical filter is disposed between a liquid crystal panel and a front windshield to block infrared light incident to the liquid crystal panel. Moreover, in Patent Document 2, a vehicle head-up display that uses two types of polymer films as infrared light cut-off portions is disclosed.

DOCUMENTS IN THE PRIOR ART

Patent Documents

Patent Document 1: Japanese Patent Application Laid-Open No. 11-23997
Patent Document 2: Japanese Patent Application Laid-Open No. 2017-138448

SUMMARY

Problems to be Solved by the Present Disclosure

In the display device described in the abovementioned Patent Document 1, when an optical filter comprises, for example, a stretched polymer film, the optical filter generates anisotropy in refractive index and exhibits birefringence. Therefore, when a visible light of a linearly polarized wave having display information emitted from a display portion is transmitted through the optical filter, the linearly polarized wave may sometimes be changed into an elliptically polarized wave. When the visible light of the elliptically polarized wave is reflected by a front windshield, a reflectance of the visible light changes according to components of the polarized wave. As a result, display information recognized by a driver is different from the display information when emitted from the display portion, and it is sometimes difficult to be confirmed visually. On the other hand, in the display device described in the abovementioned Patent Document 2, a second polymer film is disposed on a first polymer film, and the second polymer film is used to compensate for birefringence generated in the first polymer film. However, further improvements are required to reduce the amount of infrared light incident to the liquid crystal panel while maintaining visual confirmation of the driver.

Technical Solutions

A display device according to one scheme of the present disclosure comprises: a display portion emitting a visible light of a linearly polarized wave having display information; an infrared light cut-off portion transmitting the visible light from the display portion and reducing an incident amount of an infrared light to the display portion; and a reflecting portion reflecting the visible light transmitted through the infrared light cut-off portion, wherein the infrared light cut-off portion comprises an infrared light cut-off layer, the infrared light cut-off layer has a slow axis, and the slow axis is generally parallel to a vibration direction of the linearly polarized wave.

The infrared light cut-off portion of the display device transmits the visible light from the display portion, and meanwhile reduces the incident amount of the infrared light to the display portion. As a result, the brightness of the display information comprised by the visible light is maintained and meanwhile, for example, the influence of thermal energy caused by the infrared light in sunlight on the display portion is reduced. Moreover, the infrared light cut-off layer comprised in the infrared light cut-off portion has the slow axis, and the slow axis is generally parallel to the vibration direction of the linearly polarized wave. Therefore, compared with a scheme in which the slow axis is not generally parallel to the vibration direction of the linearly polarized wave, a ratio of changing the visible light of the linearly polarized wave into the elliptical polarized wave after being transmitted from the infrared light cut-off portion is reduced. As a result, a visual confirmer such as a driver of a vehicle can easily recognize the display information comprised by the visible light emitted from the display portion as described above, and the visual confirmation of the display information will be maintained.

In a display device according to another scheme, the term "generally parallel" may mean that an angle formed by the slow axis and the vibration direction of the linearly polarized wave is greater than 0 degree and less than 10 degrees.

According to the display device, after the visible light from the display portion is transmitted from the infrared light cut-off portion, the ratio of changing the linearly polarized wave of the visible light into the elliptically polarized wave is further reduced. The ratio occupied by the elliptically polarized wave in the visible light passing through the infrared light cut-off portion is further reduced, and therefore, a visual confirmer who recognizes the visible light reflected by the reflecting portion can recognize similar display information by the display information of the visible light emitted from the display portion.

In a display device according to another scheme, an incidence angle of the linearly polarized wave with respect to the infrared light cut-off portion may be greater than 0 degree and less than 90 degrees.

According to the display device, it is easy to adjust an orientation of the infrared light cut-off portion with respect to a light path of the visible light from the display portion, so that a part of the external light, such as the sunlight, after reflected by the infrared light cut-off portion, does not proceed towards eyes of the visual confirmer such as the driver.

In a display device according to another scheme, the infrared light cut-off portion may further comprise an ultra-violet light cut-off layer reducing a transmittance of an ultra-violet light, and the infrared light cut-off layer and the ultra-violet light cut-off layer may both have transmissivity in a visible light region.

According to the display device, the infrared light cut-off portion further comprises the ultra-violet light cut-off layer, and therefore, the ultra-violet light comprised in the sunlight or the like is prevented from being irradiated to the display portion. Moreover, the infrared light cut-off layer and the ultra-violet light cut-off layer both have transmissivity in the visible light region, and therefore, the brightness of the display information comprised by the visible light passing through the infrared light cut-off portion will be maintained.

In a display device according to another scheme, the transmissivity may have a transmittance greater than 60% in the visible light region.

According to the display device, the brightness of the display information comprised by the visible light passing through the infrared light cut-off portion will be further maintained.

In a display device according to another scheme, the infrared light cut-off portion may comprise a hard coating.

According to the display device, the infrared light cut-off portion may comprise the hard coating, and therefore, a mechanical strength of the infrared light cut-off portion is increased. Moreover, a resistance to scratches and the like is increased.

In a display device according to another scheme, the ultra-violet light cut-off layer may be an adhesive layer.

The ultra-violet light cut-off layer of the display device may be the adhesive layer, and therefore can be stacked to, for example, the infrared light cut-off layer by its adhesiveness.

In a display device according to another scheme, the display device may further comprise a window portion assembled on an opening provided in an instrument board of a vehicle and disposed between the display portion and the reflecting portion on a light path of the visible light, and the infrared light cut-off portion is provided between the window portion and the reflecting portion.

According to the display device, the infrared light cut-off portion is provided on the window portion and can protect the window portion. The window portion can be consisted of a material such as a resin having a small mechanical strength.

In a display device according to another scheme, the display device may further comprise a window portion assembled on an opening provided in an instrument board of a vehicle and disposed between the display portion and the reflecting portion on a light path of the visible light, and the infrared light cut-off portion is provided between the display portion and the window portion.

According to the display device, the infrared light cut-off portion and the display portion are disposed in the instrument board and, for example, can be protected by a window material such as glass.

Effect of the Present Disclosure

According to one aspect of the present disclosure, it is easy to reduce the incident amount of the infrared light to the display portion on the basis of maintaining the visual confirmation of the display information.

BRIEF DESCRIPTION OF THE DRAWINGS

FIG. 6(a) is an illustrative view showing an orientation of a vibration direction of a visible light incident on the infrared light cut-off portion, and FIG. 6(b) is an enlarged view showing a relationship between the vibration direction of the visible light and a slow axis of the infrared light cut-off portion.

Figure 1:
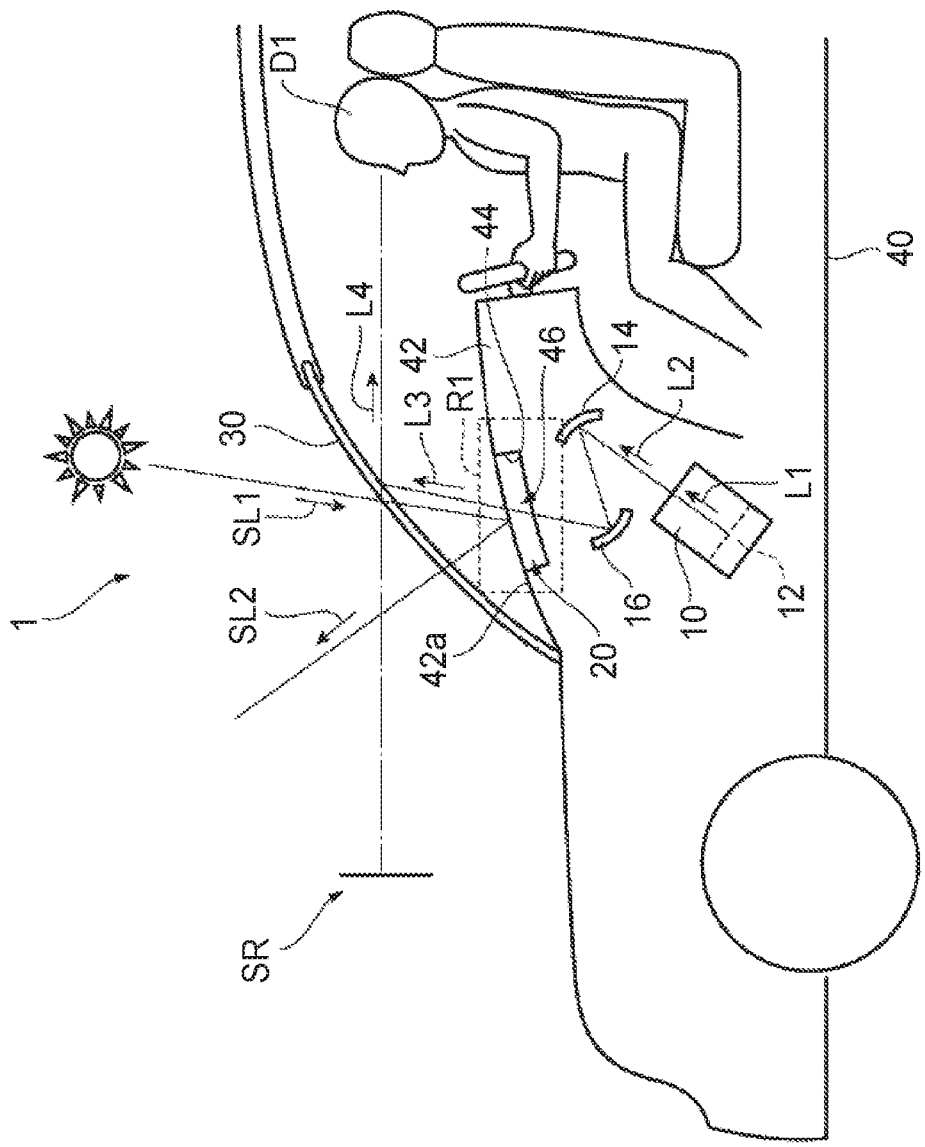
FIG. 1 is a view showing an example of a display device according to an implementation of the present disclosure.

DESCRIPTION OF REFERENCE NUMERALS 1 display device;
10 display portion;
20 infrared light cut-off portion;
22 infrared light cut-off layer;
24 ultra-violet light cut-off layer;
25 hard coating;
30 reflecting portion;
40 vehicle;
42 instrument board;
44 opening;
46 window portion; and
SA1 slow axis.

DETAILED DESCRIPTION

A display device according to an implementation of the present disclosure comprises: a display portion emitting a visible light of a linearly polarized wave having display information; an infrared light cut-off portion transmitting the visible light from the display portion and reducing an incident amount of an infrared light to the display portion; and a reflecting portion reflecting the visible light transmitted through the infrared light cut-off portion, wherein the infrared light cut-off portion comprises an infrared light cut-off layer, the infrared light cut-off layer has a slow axis, and the slow axis is generally parallel to a vibration direction of the linearly polarized wave.

The infrared light cut-off portion of the display device transmits the visible light from the display portion, and meanwhile reduces the incident amount of the infrared light to the display portion. As a result, the brightness of the display information comprised by the visible light is maintained and meanwhile, for example, the influence of thermal energy caused by the infrared light in sunlight on the display portion is reduced. Moreover, the infrared light cut-off layer comprised in the infrared light cut-off portion has the slow axis, and the slow axis is generally parallel to the vibration direction of the linearly polarized wave. Therefore, compared with a scheme in which the slow axis is not generally parallel to the vibration direction of the linearly polarized wave, a ratio of changing the visible light of the linearly polarized wave into the elliptical polarized wave after being transmitted from the infrared light cut-off portion is reduced. As a result, a visual confirmer such as a driver of a vehicle can easily recognize the display information comprised by the visible light emitted from the display portion as described above, and the visual confirmation of the display information will be maintained.

It should be noted that, the term "display information" in the present specification widely comprises information that can be used to understand or recognize a specific meaning through visual confirmation. For example, in the case of a vehicle-mounted display device, maps, traffic signs, and other navigation information are widely comprised. The above "reduce the incident amount of the infrared light to the display portion" means reducing the incident amount of the infrared light to the display portion by absorbing or reflecting the infrared light. Furthermore, the above "anisotropy in refractive index" means that in a two-dimensional medium such as a polymer film, the refractive index varies according to each direction of a two-dimensional plane, that is, the refractive index has an in-plane anisotropy. Moreover, an "MD direction (Machine Direction)" indicates a direction (longitudinal direction) in which the polymer film is wound, and a "CD direction (Cross Machine Direction)" indicates a direction (lateral direction) perpendicular to the longitudinal direction.

Hereinafter, implementations of the display device are described in detail with reference to the accompanying drawings. In the present specification, the same reference numerals are used for the same elements, and repeated descriptions are omitted. In this implementation, an X-axis, a Y-axis, and a Z-axis are set for the accompanying drawings, but each of these axes are set for convenience of description. The Z-axis is set in a direction of a stack of the infrared light cut-off portion.

FIG. 1 is a view showing an example of a display device according to an implementation of the present disclosure. FIG. 1 shows an example in which a display device 1 according to the present implementation is applied as a vehicle head-up display. The display device 1 comprises a display portion 10, an infrared light cut-off portion 20, and a reflecting portion 30 in a vehicle 40. The display device 1 may further comprise a light source 12. The light source 12 comprises, for example, a hidden lamp, a halogen lamp, a light emitting diode, or a cold cathode tube. The light source 12 generates a visible light L1.

The display portion 10 comprises, for example, a liquid crystal panel, an organic EL panel, a digital mirror device, an MEMS display, and a laser display, and has display information. The display portion 10 receives the visible light L1 from the light source 12, and emits a visible light L2 of a linearly polarized wave having the display information towards the infrared light cut-off portion 20. In the case where the display portion 10 comprises an organic EL panel, the display portion 10 and the light source 12 may be integrated, and the display portion 10 integrated with the light source 12 can emit the visible light L2 towards the infrared light cut-off portion 20. FIG. 1 shows an example in which the display portion 10 and the light source 12 are integrated.

In the present implementation, a first light path changing portion 14 and a second light path changing portion 16 may be further comprised between the display portion 10 and the infrared light cut-off portion 20. After sequentially changed in its light path by the first light path changing portion 14 and the second light path changing portion 16, the visible light L2 passing through the display portion 10 is incident on the infrared light cut-off portion 20. That is, the visible light L2 is changed in its light path by the first light path changing portion 14 towards the second light path changing portion 16, and then changed in its light path by the second light path changing portion 16 towards the infrared light cut-off portion 20. The first light path changing portion 14 and the second light path changing portion 16 both comprise, for example, a mirror such as a flat mirror or a concave mirror.

The infrared light cut-off portion 20 reduces the incident amount of the infrared light to the display portion 10. The infrared light is light comprised in sunlight and the like. Moreover, the infrared light cut-off portion 20 transmits the visible light L2 from the display portion 10 and emits a transmitted visible light L3 towards the reflecting portion 30. The reflecting portion 30 comprises, for example, a front windshield of the vehicle 40, and reflects the visible light L3 transmitted from the infrared light cut-off portion 20 towards a visual confirmer D1 such as a driver. Upon receiving the reflected visible light L4, the visual confirmer D1 can visually confirm the display information at a position SR separated by the front windshield in addition to the outside field of view in front of the vehicle 40.

As described above, the infrared light cut-off portion 20 transmits the visible light L2 from the display portion 10 and meanwhile reduces the incident amount of the infrared light to the display portion 10. As a result, the brightness of the display information comprised by the visible light L2 is maintained and meanwhile, for example, the influence of the thermal energy caused by the infrared light in the sunlight on the display portion 10 is reduced.

The vehicle 40 comprises an instrument board 42, and an opening 44 may be disposed on the instrument board 42. The opening 44 is provided in, for example, an upper portion 42a of the instrument board 42. The display device 1 may further comprise a window portion 46. The window portion 46 is assembled to the opening 44 and is disposed between the display portion 10 and the reflecting portion 30 on a light path of the visible light L2.

Figure 2B:
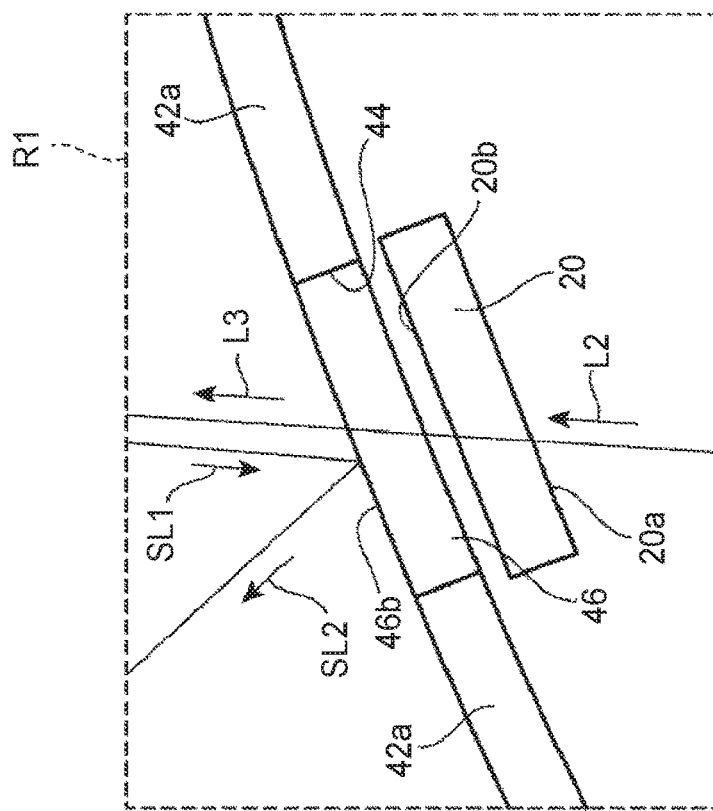
FIG. 2(a) and FIG. 2(b) are enlarged views of a region R1 shown in FIG. 1.
Figure 2A:
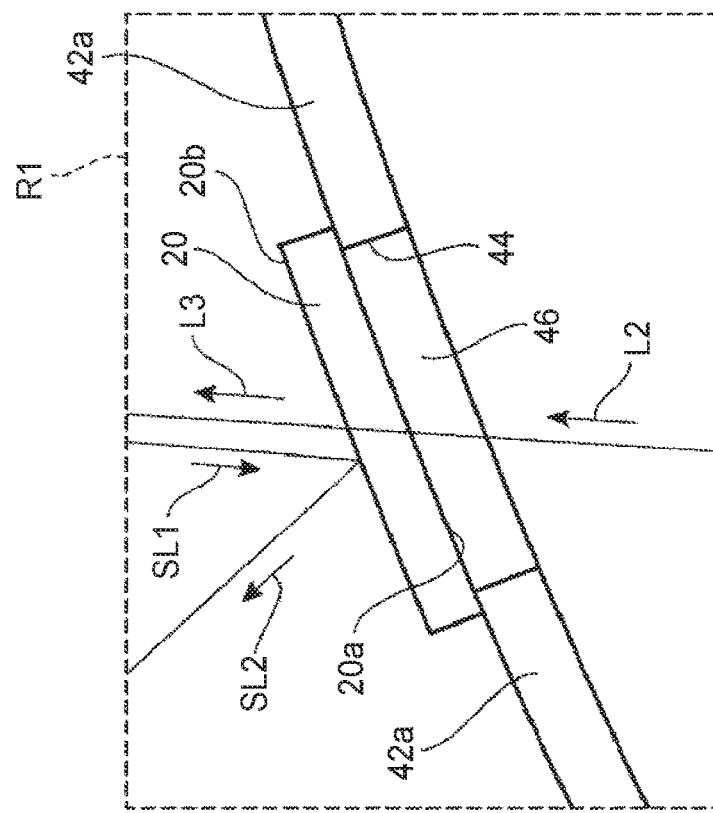

FIG. 2(a) and FIG. 2(b) are enlarged views of a region R1 shown in FIG. 1. FIG. 2(a) shows a first example, and FIG. 2(b) shows a second example.

As shown in FIG. 2(a), in the first example, the infrared light cut-off portion 20 may be provided between the window portion 46 and the reflecting portion 30. Specifically, the infrared light cut-off portion 20 is provided, for example, on the window portion 46. The infrared light cut-off portion 20 has a lower surface 20a and an upper surface 20b on the opposite side of the lower surface 20a, and the lower surface 20a is located, for example, on the window portion 46.

In the first example, the visible light L2 from the display portion 10 is transmitted in the order of the window portion 46 and the infrared light cut-off portion 20, and visible light L3 is emitted from the infrared light cut-off portion 20. Moreover, an external light SL1 such as sunlight is incident to the infrared light cut-off portion 20, and a part of the incident light SL1 is reflected by the upper surface 20b of the infrared light cut-off portion 20 and becomes a reflected light SL2.

The infrared light cut-off portion 20 of the display device 1 in the first example is provided on the window portion 46, and thus can protect the window portion 46. As a result, the window portion 46 can be formed by using a material such as a resin with a mechanical strength lower than that of glass or the like. For example, these materials may include polyester, polycarbonate, polysulfone, polyethersulfone, alicyclic olefin polymer, chain-like olefin polymer such as polyethylene or polypropylene, triacetyl cellulose, polyvinyl alcohol, polyimide, polyarylate, modified acrylic polymer, epoxy resin, polystyrene, synthetic resin such as acrylic resin, and the like.

As shown in FIG. 2(b), in the second example, the infrared light cut-off portion 20 may also be provided between the display portion 10 and the window portion 46. In other words, the infrared light cut-off portion 20 may be disposed at a position below the window portion 46, specifically, in the instrument board 42. As a result, the infrared light cut-off portion 20 can be protected by the window portion 46. In this case, it is ideal to form the window portion 46 by a window material strong enough to protect the infrared light cut-off portion 20, and for example, the window material may include glass, reinforced plastic, or the like.

In the second example, the visible light L2 from the display portion 10 is transmitted in the order of the infrared light cut-off portion 20 and the window portion 46, and the visible light L3 is emitted from the window portion 46. Moreover, the external light SL1 such as the sunlight is incident to the window portion 46, and a part of the incident light SL1 is reflected by the upper surface 46b of the window portion 46 and becomes a reflected light SL2.

According to the display device 1 of the second example, the infrared light cut-off portion 20 and the display portion 10 are disposed in the instrument board 42 and can be protected by the window material.

The infrared light cut-off portion 20 transmits the visible light L2 from one surface such as the lower surface 20a thereof, and reduces an amount of the incident infrared light SL1 from another surface such as the upper surface 20b. The infrared light cut-off portion 20 comprises an infrared light cut-off layer 22 (referring to FIG. 4). The infrared light cut-off layer 22 may have transmissivity in a visible light region.

According to the display device 1, the infrared light cut-off layer 22 has transmissivity in the visible light region, and therefore, the brightness of the display information comprised by the visible light passing through the infrared light cut-off portion 20 will be maintained. In the display device 1, the transmissivity may have a transmittance greater than 60% in the visible light region. According to the display device 1, the brightness of the display information comprised by the visible light passing through the infrared light cut-off portion 20 will be further maintained.

The infrared light cut-off layer 22 comprises, for example, an infrared light cut-off film cut out from a stretched polymer film wound in a roller shape. The infrared light cut-off film may be composed of a polymer film, specifically a film such as a polyester film, that reduces the transmission amount of infrared light.

Figure 3A:
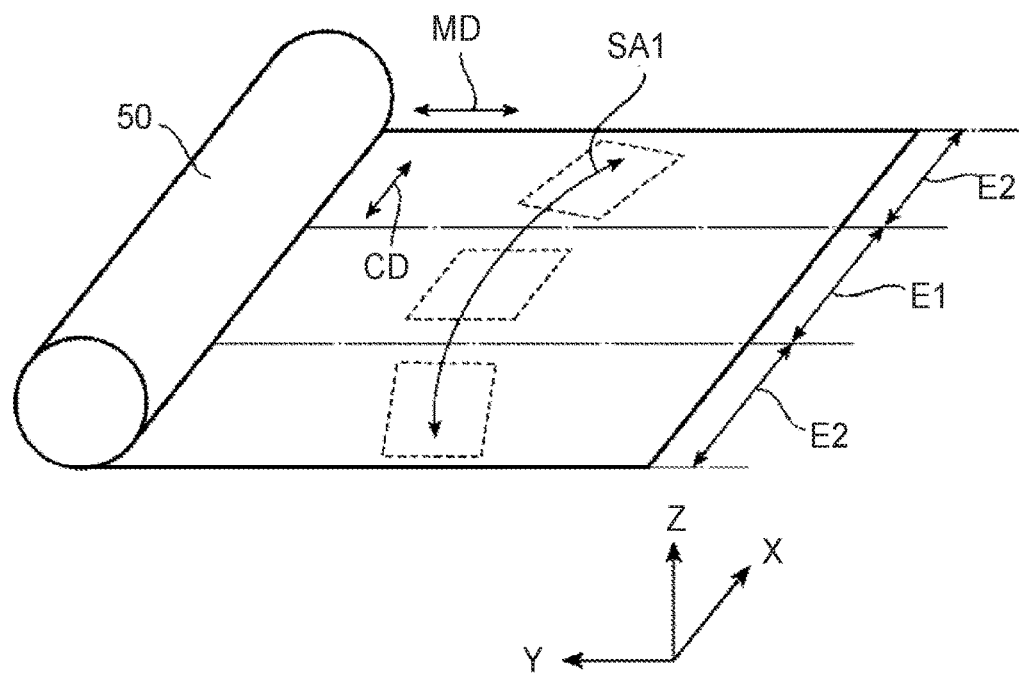
FIG. 3(a) is an external view schematically showing a stretched polymer film wound in a roller shape.
Figure 3B:
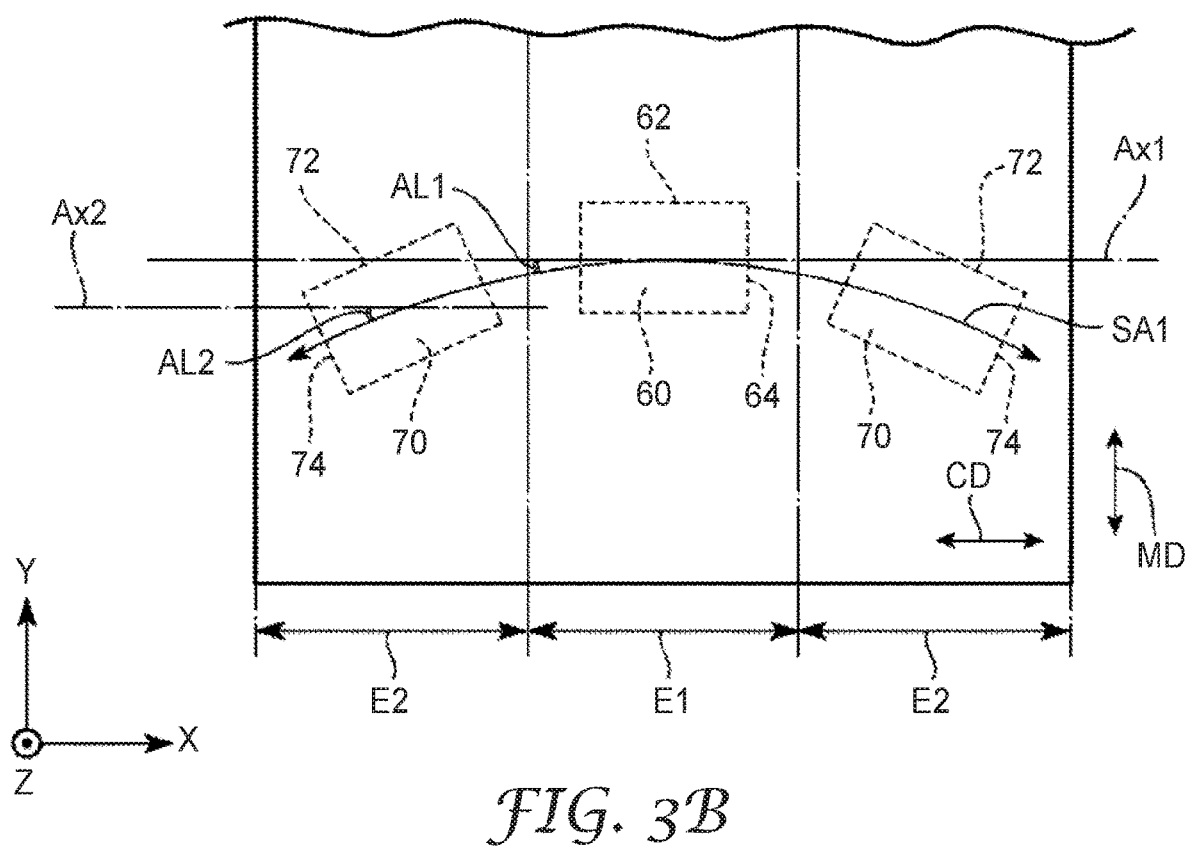
FIG. 3(b) is a top view schematically showing the stretched polymer film of FIG. 3(a).

FIG. 3(a) is an external view schematically showing a stretched polymer film wound in a roller shape. FIG. 3(b) is a top view schematically showing the stretched polymer film of FIG. 3(a). The stretched polymer film 50 is wound in the MD direction and, moreover, has a central region E1 and peripheral regions E2 arranged in the CD direction. The central region E1 is a region located between the peripheral regions E2 in the CD direction.

Figure 4A:
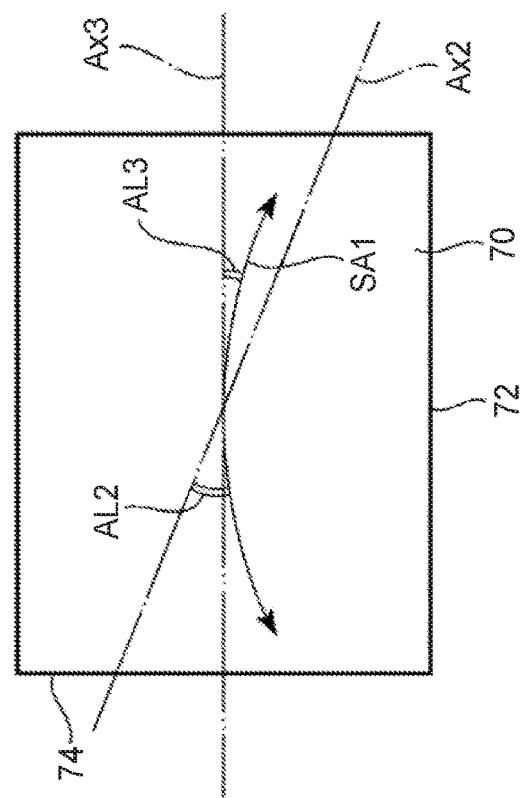
FIG. 4(a) is a top view of an infrared light cut-off film formed by cutting out a stretched polymer film in a central region.
Figure 4B:
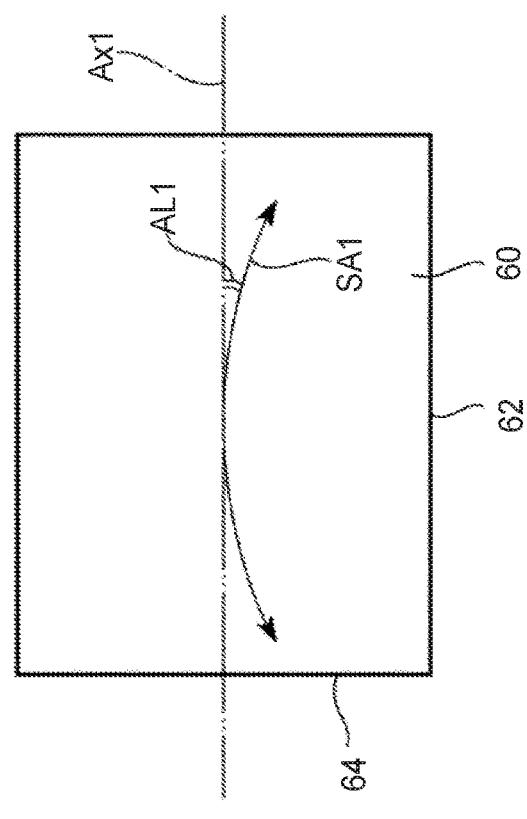
FIG. 4(b) is a top view of an infrared light cut-off film formed by cutting out a stretched polymer film in a peripheral region.

FIG. 4(a) is a top view of an infrared light cut-off film formed by cutting out a stretched polymer film in a central region. FIG. 4(b) is a top view of an infrared light cut-off film formed by cutting out a stretched polymer film in a peripheral region.

The stretched polymer film 50 has a feature that a refractive index in a direction of a main chain of a molecular chain constituting the polymer and a refractive index in a direction orthogonal to the main chain are different from each other. Moreover, the stretched polymer film 50 is stretched in its manufacturing process and has anisotropy in refractive index.

In the stretched polymer film 50, the refractive index in the MD direction and the refractive index in the CD direction are different from each other. For example, when a polymer film having a positive inherent birefringence is stretched in the CD direction, the refractive index in the CD direction becomes greater than the refractive index in the MD direction. Moreover, as shown in FIG. 3(a) and FIG. 3(b), in the stretched polymer film 50, a slow axis SA1 indicating the direction having the largest refractive index is curved instead of linear in the CD direction.

As shown in FIG. 3(a) and FIG. 3(b), the infrared light cut-off film can be formed by cutting out the stretched polymer film 50 from the central region E1 and the peripheral regions E2. In the present implementation, the infrared light cut-off film 60 having, for example, a generally rectangular two-dimensional shape may be cut out from the central region E1 of the stretched polymer film 50. The infrared light cut-off film 60 has long sides 62 and short sides 64 generally perpendicular to the long sides 62. The infrared light cut-off film 60 may be cut in a manner in which its long side 62 is generally parallel to the CD direction of the stretched polymer film 50. In the infrared light cut film 60, for example, in a case where a tangent direction of a central portion of the slow axis SA1 is set as a first axis Ax1, the first axis Ax1 is generally parallel to the CD direction of the infrared light cut film 60, and on the other hand, a tangent line of each portion of the slow axis SA1 except the central portion has an angle (orientation angle) AL1 that intersects with the first axis Ax1.

In the present implementation, an infrared light cut-off film 70 having, for example, a generally rectangular two-dimensional shape may be cut out from the peripheral region E2 of the stretched polymer film 50. The infrared light cut-off film 70 has long sides 72 and short sides 74 generally perpendicular to the long sides 72. The infrared light cut-off film 70 may be cut out in a manner in which its long side 62 is generally parallel to the slow axis SAL In the infrared light cut-off film 70, for example, in a case where a direction that intersects with a central portion of the slow axis SA1 and is generally parallel to the first axis Ax1 is set as a second axis Ax2, a tangent line of an intersection of the slow axis SA1 and the second axis Ax2 has an angle (orientation angle) AL2 that intersects with the second axis Ax2.

In the present implementation, the orientation angle AL2 is greater than the orientation angle AL1, and the orientation angle becomes greater as it goes from a central portion towards an end portion in the CD direction.

Then, the slow axis SA1 of the infrared light cut-off film 60 is described with reference to FIG. 4(a). The infrared light cut-off film 60 is formed by cutting out the stretched polymer film 50 from the central region E1. A direction of the long sides 62 of the infrared light cut-off film 60 is generally parallel to a direction along the first axis Ax1, i.e., the slow axis SA1 of the infrared light cut-off film 60.

The orientation angle AL1 of the slow axis SA1 of the infrared light cut-off film 60 indicates a magnitude of deviation of the slow axis SA1 with respect to the first axis Ax1 in a plane of the infrared light cut-off film 60. In the plane of the infrared light cut-off film 60, if the orientation angle AL1 is small, it can be considered that the slow axis SA1 is generally parallel to the first axis Ax1. In order to be considered as being generally parallel, for example, the orientation angle AL1 preferably ranges from 0 degree to 10 degrees. Here, the orientation angle AL1 of 0 degree means that the slow axis SA1 is parallel to the first axis Ax1, and "generally parallel" also comprises "parallel."

For example, the orientation angle AL1 more preferably ranges from 0 degree to 5 degrees. By setting the orientation angle AL1 in the range, the slow axis SA1 of the infrared light cut-off film 60 can be more parallel to the first axis Ax1.

In addition to being rectangular, the two-dimensional shape of the infrared light cut-off film 60 may be, for example, quadrangle shaped such as square shaped or rhombus shaped, or circular, or elliptic.

Then, the slow axis SA1 of the infrared light cut-off film 70 is described with reference to FIG. 4(*b*). The infrared light cut-off film 70 is formed by cutting out the stretched polymer film 50 from the peripheral region E2. It is shown that in a case where the tangent direction of the central portion of the slow axis SA1 is set to a third axis Ax3, in the infrared light cut-off film 70, a direction of its long side 72 is generally parallel to a direction along the third axis Ax3, i.e., the slow axis SA1 of the infrared light cut-off film 70.

In the infrared light cut-off film 70, a tangent line of each portion of the slow axis SA1 except the central portion has an angle (orientation angle) AL3 that intersects with the third axis Ax3, and the orientation angle AL3 indicates a magnitude of deviation of the slow axis SA1 with respect to the third axis Ax3 in the plane of the infrared light cut-off film 70. In the plane of the infrared light cut-off film 70, if the orientation angle AL3 is small, it can be considered that the slow axis SA1 is generally parallel to the third axis Ax3. In order to be considered as being generally parallel, for example, the orientation angle AL3 preferably ranges from 0 degree to 10 degrees.

For example, the orientation angle AL3 more preferably ranges from 0 degree to 5 degrees. By setting the orientation angle AL3 in the range, the slow axis SA1 of the infrared light cut-off film 70 can be more parallel to the third axis Ax3.

The two-dimensional shape of the infrared light cut-off film 70 is the same as that of the infrared light cut-off film 60. In addition to being rectangular, for example, it may also be quadrangle shaped such as square shaped or rhombus shaped, or circular, or elliptic.

Figure 5:
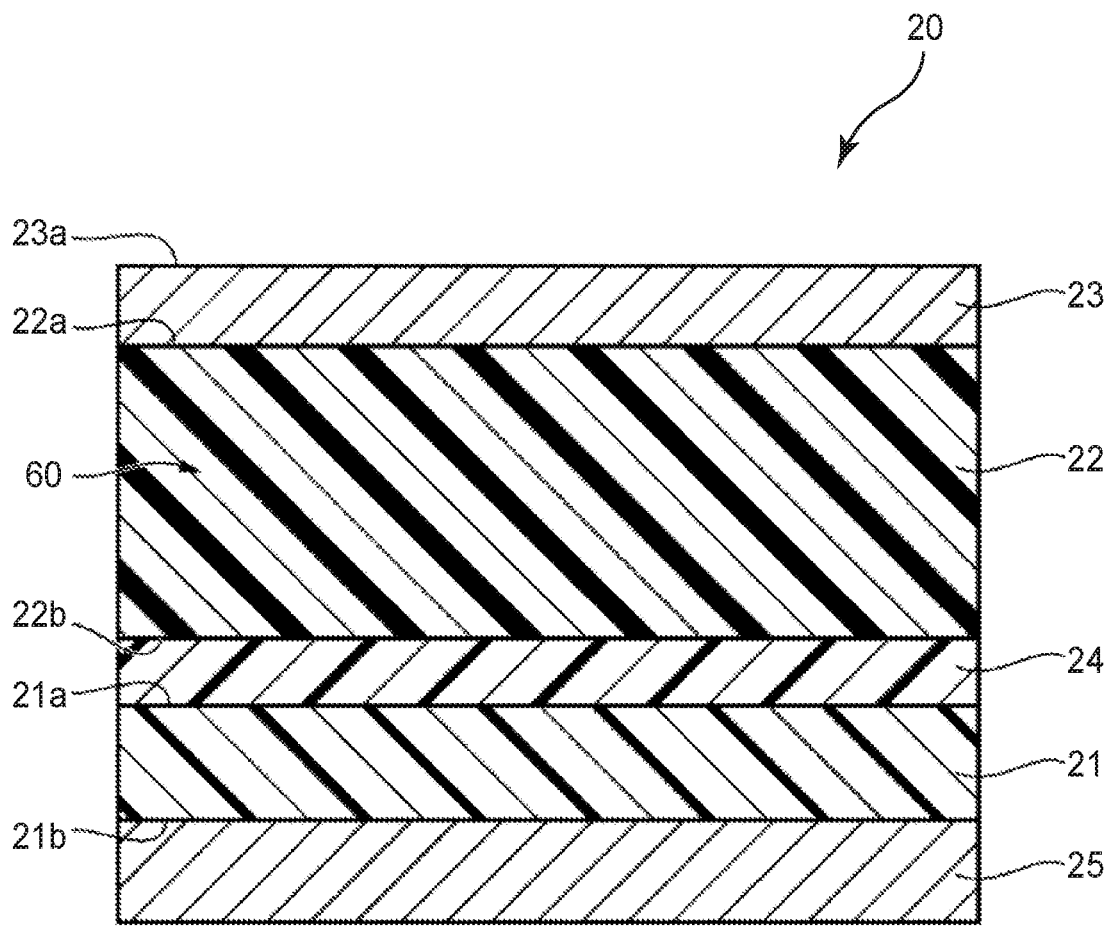
FIG. 5 is a cross-sectional view of an infrared light cut-off portion according to an implementation of the present disclosure.

Then, the structure and material of the infrared light cut-off portion 20 are further described in detail with reference to FIG. 5. FIG. 5 is a cross-sectional view of an infrared light cut-off portion according to an implementation of the present disclosure. The infrared light cut-off portion 20 comprises a substrate 21 and an infrared light cut-off layer 22. The substrate 21 has an upper surface 21*a* and a lower surface 21*b*, and the infrared light cut-off layer 22 is, for example, provided on or above the upper surface 21*a* of the substrate 21. The infrared light cut-off layer 22 comprises an infrared light cut-off film 60.

The substrate 21 comprises, for example, polycarbonate, polyester, polysulfone, polyethersulfone, alicyclic olefin polymer, chain-like olefin polymer such as polyethylene or polypropylene, triacetyl cellulose, polyvinyl alcohol, polyimide, polyarylate, modified acrylic polymer, epoxy resin, polystyrene, and synthetic resin such as acrylic resin. The thickness of the substrate 21 is, for example, 10 µm to 5000 µm.

As the infrared light cut-off film 60 comprised in the infrared light cut-off layer 22, a single-layer polymer film or a multi-layer polymer film containing an infrared-absorbing material can be used. The single-layer polymer film may comprise, for example, polyethylene terephthalate (PET), polyethylene naphthalate (PEN), acrylic-based resin, polycarbonate resin, olefin-based resin, and polyimide resin. The thickness of the single-layer polymer film is, for example, 10 µm to 1000 µm.

The multi-layer polymer film may be a multi-layer optical film (MOF) stacked with a plurality of polymer films, and a multi-layer structure with an adjusted thickness of each layer is used to reflect infrared light. The thickness of each layer is, for example, 100 nm to 1000 nm.

The polymer film of the infrared light cut-off film 60 comprises, for example, a polymer and a copolymer of crystalline, semi-crystalline, or liquid crystal.

The material comprised in the polymer film as the infrared light cut-off film 60 may comprise, for example, polyester, polyethylene naphthalate (PEN) (specifically naphthalene dicarboxylic polyester) and isomers thereof (e.g., 2,6-, 1,4-, 1,5-, 2,7-, and 2,3-PEN), polybutylene naphthalate, polyalkylene terephthalate (e.g., polyethylene terephthalate, polybutylene terephthalate, and poly-1,4-cyclohexanedimethylene terephthalate), polyimide (e.g., polyacrylic imide), polyetherimide, atactic polystyrene, polycarbonate, polymethacrylate (e.g., polyisobutyl methacrylate, polypropylmethacrylate, polyethylmethacrylate, and polymethylmethacrylate), polyacrylate (e.g., polybutylacrylate and polymethylacrylate), syndiotactic polystyrene (sPS), syndiotactic poly-alpha-methyl styrene, syndiotactic polydichlorostyrene, copolymers and mixtures formed of any of these polystyrenes, cellulose derivatives (e.g., ethyl cellulose, cellulose acetate, cellulose propionate, cellulose acetate butyrate, and nitrocellulose), polyalkylidene polymers (e.g., polyethylene, polypropylene, polybutene, polyisobutylene, and poly(4-methyl)pentene), fluorinated polymers (e.g., perfluoroalkoxy resin, polytetrafluoroethylene, fluorinated ethylene-propylene copolymer, polyvinylidene fluoride, and polychlorotrifluoroethylene), chlorinated polymers (e.g., polyvinylidene chloride, and polyvinylchloride), polysulfone, polyethersulfone, polyacrylonitrile, polyamide, silicone resin, epoxy resin, polyvinylacetate, polyetheramide, ionomeric resin, elastomers (e.g., polybutadiene, polyisoprene, and neoprene), and polyurethane.

Other materials comprised by the polymer film as the infrared light cut-off film 60 may comprise, for example, coPEN, that is, copolymers of PEN (for example, copolymers of 2,6-, 1,4-, 1,5-, 2,7- and/or 2,3-naphthalene dicarboxylic acid or esters thereof, with (a) terephthalic acid or esters thereof, (b) isophthalic acid or esters thereof, (c) phthalic acid or esters thereof, (d) alkanediol, (e) cycloalkane glycol (e.g., cyclohexane dimethanol diol), (f) alkanedicarboxylic acid, and/or (g) cycloalkane dicarboxylic acid (e.g., cyclohexane dicarboxylic acid), copolymers of polyalkylene terephthalate (e.g., copolymers of terephthalic acid, or esters thereof, with (a) naphthalene dicarboxylic acid or esters thereof, (b) isophthalic acid or esters thereof, (c) phthalic acid or esters thereof, (d) alkanediol, (e) cycloalkane glycol (e.g., cyclohexane dimethanol diol), (f) alkanedicarboxylic acid, and/or (g) cycloalkane dicarboxylic acid (e.g., cyclohexane dicarboxylic acid), styrene copolymers (e.g., styrene-butadiene copolymers and styrene-acrylonitrile copolymers), and copolymers of 4,4'-dibenzoic acid and ethylene glycol.

The polymer films of the infrared light cut-off film 60 may each contain a mixture of two or more of the above polymers or copolymers, for example, a mixture of sPS and atactic polystyrene. Moreover, the coPEN may be a mixture of particles, in which at least one component is a polymer using naphthalene dicarboxylic acid as a base material, and other components may be other polyesters or polycarbonates such as PET, PEN, or coPEN.

The PEN is preferable as a material comprised by the polymer film of the infrared light cut-off film 60, and is thermally stable from about 155° C. to about 230° C. In addition to the PEN, preferred materials may include, for example, polybutylene naphthalate and other crystalline naphthalene dicarboxylic polyesters.

In the polymer film of the infrared light cut-off film 60, a small amount of comonomer can be substituted into the naphthalene dicarboxylic polyester within a range in which the refractive index thereof is not substantially changed. Preferred monomers may include substances based on isophthalic acid, azelaic acid, adipic acid, sebacic acid, dibenzoic acid, terephthalic acid, 2,7-naphthalene dicarboxylic acid, and 2,6-naphthalene dicarboxylic acid, or cyclohexane dicarboxylic acid. It should be noted that, when a small amount of comonomer is substituted into the naphthalene dicarboxylic polyester, the refractive index may be reduced. However, even if the refractive index is reduced, it can be compensated by any of adhering to a polymer layer, reducing the extrusion temperature during film manufacturing, optimizing matching of melt viscosity, and optimizing matching of the glass transition temperature for film stretching during film manufacturing.

In concern with reasons of the thickness, flexibility, and economical efficiency of the multi-layer polymer film, the number of layers comprised in the multi-layer polymer film is selected such that the desired optical property is implemented with the minimum number of layers. The number of layers is preferably less than about 10000, more preferably less than about 5000, and even more preferably less than about 2000.

For the infrared light cut-off film 60, in the manufacturing process thereof, it can be formed by simultaneously extruding the polymer material comprised in respective film of single-layer and multi-layer polymer films. In the manufacturing process of the film, the film is then subjected to an orientation process by stretching at a specified temperature to form a film having a desired thickness. As desired, a heat-curing process may sometimes be performed at a specified temperature. The extrusion process and the orientation process can be performed simultaneously.

Moreover, as a method of stacking polymer films, each of the films can be fixedly stacked using an adhesive. Specifically, for example, a pressure-sensitive adhesive, a hot-melt adhesive, an active energy ray-curable adhesive, a moisture-curable adhesive, a heat-curable adhesive, an anaerobic adhesive, and the like can be used. The type thereof can be appropriately determined according to the material and the like of each polymer film. For example, acrylic-based, vinyl alcohol-based, silicone-based, polyester-based, polyurethane-based, polyether-based adhesives can be used, and adhesives with high transparency can be used. These adhesives may be directly coated to a surface of each polymer film, or a layer of an adhesive tape, a sheet or the like made of an adhesive may also be adhered to a whole or a part of a surface of the polymer film. Moreover, as a method of stacking polymer films, a frame that can at least partially surround an end of each polymer film may be prepared, and a plurality of polymer films may be overlapped and fixedly arranged by using the frame.

As shown in FIG. 5, the infrared light cut-off portion 20 further comprises an infrared light reduction layer 23 as desired. The infrared light reduction layer 23 reduces the transmission amount of the infrared light by at least one of reflection and absorption. The infrared light cut-off layer 22 has an upper surface 22a and a lower surface 22b, and the infrared light reduction layer 23 is provided, for example, on the upper surface 22a of the infrared light cut-off layer 22. The infrared light cut-off layer 22 may be located between the infrared light reduction layer 23 and the substrate 21. In the infrared light cut-off portion 20, the infrared light reduction layer 23 may be provided, for example, on the lower surface 22b of the infrared light cut-off layer 22 as desired. The infrared light reduction layer 23 may also be provided, for example, on both the upper surface 22a and the lower surface 22b of the infrared light cut-off layer 22 as desired. Regardless of the configuration, the infrared light reduction layer 23 can reduce the transmission amount of the infrared light.

The infrared light reduction layer 23 comprises, for example, a metal, a metal alloy, or an oxide semiconductor, and mainly reflects light in a near-infrared region with a wavelength of 1 μm or more and an infrared region. For example, the metal may include silver, gold, copper, or aluminum. Silver is a particularly preferred metal because it can be easily formed into a thin film shape and can easily reflect light in the near-infrared region and the infrared region. The metal alloy comprises a silver alloy, a stainless steel, or inconel. Among the metal alloys, a silver alloy containing at least 30% silver by weight is a particularly preferred material because it is easy to produce a thin film and it is easy to reflect light in the near-infrared region and the infrared region. A silver alloy containing silver, less than 50% gold by mass, and/or less than 20% copper by mass is also excellent in terms of durability, and is therefore a preferred material. For example, the oxide semiconductor preferably comprises tin dioxide ($SnO_2$), zinc oxide (ZnO), indium tin oxide (ITO), or antimony tin oxide (ATO). The metal, the metal alloy, or the oxide semiconductor may be formed into a single layer, or may be formed into a plurality of layers.

The infrared light reduction layer 23 is formed by, for example, thermal decomposition, powder coating, evaporation, cathode sputtering, ion plating, or the like, and the metal, the oxide semiconductor, or the metal alloy is formed on a polymer film. From the viewpoint of obtaining a uniform film structure and thickness, cathode sputtering and ion plating are preferred manufacturing methods. The infrared light reduction layer 23 may be another metallized polymer or a glass sheet laminated to a multi-layer polymer film using an adhesive. The adhesive comprises, for example, a hot-melt adhesive or a pressure-sensitive adhesive. The hot-melt adhesive is, for example, a VITEL 3300 adhesive manufactured by Shell Chemicals Company (Ohio, USA), and the pressure-sensitive adhesive is, for example, an acrylic-based adhesive of 90/10 IOA/AA and 95/5 IOA/acrylamide manufactured by 3M Company (Minnesota, USA).

The metal and the metal alloy may be coated to a thickness of about 10 nm to about 40 nm, and preferably coated to a thickness of about 12 nm to about 30 nm. The oxide semiconductor layer may be coated to a thickness of about 20 nm to about 200 nm, and preferably coated to a thickness of about 80 nm to about 120 nm. When the infrared light reduction layer 23 is a metallized polymer or glass sheet laminated on a multi-layer polymer film, the coating thickness of the metal or metal alloy on the sheet is, for example, about 10 nm to about 40 nm, and the coating thickness of the oxide semiconductor on the sheet is, for example, about 20 nm to about 200 nm.

The infrared light cut-off portion 20 of the present implementation may include the infrared light reduction layer 23, and therefore, the incident amount of the infrared light to the display portion 10 can be further reduced. On the other hand, the infrared light cut-off portion 20 transmits the visible light having the display information, and thus maintains the brightness of the display information.

As shown in FIG. 5, the infrared light cut-off portion 20 further comprises an ultra-violet light cut-off layer 24 as desired. The ultra-violet light cut-off layer 24 reduces the transmission amount of ultra-violet light. The ultra-violet light cut-off layer 24 is provided, for example, below the lower surface 22b of the infrared light cut-off layer 22, and may be located between the infrared light reduction layer 23 and the substrate 21. In the infrared light cut-off portion 20, the ultra-violet light cut-off layer 24 may be provided, for example, on the upper surface 21a of the infrared light cut-off layer 22. The ultra-violet light cut-off layer 24 may be provided, for example, on both the upper surface 22a and the lower surface 22b of the infrared light cut-off layer 22 as desired. Regardless of the configuration, the ultra-violet light cut-off layer 24 can reduce the transmission amount of the ultra-violet light.

The ultra-violet light cut-off layer 24 may have transmissivity in a visible light region. According to the display device 1, the infrared light cut-off portion 20 further comprises the ultra-violet light cut-off layer 24, and therefore, the ultra-violet light comprised in sunlight or the like is prevented from being irradiated to the display portion 10. Moreover, the ultra-violet light cut-off layer has transmissivity in the visible light region, and therefore, the brightness of the display information comprised by the visible light passing through the infrared light cut-off portion 20 will be maintained. In the display device 1, the transmissivity may have a transmittance greater than 60% in the visible light region. According to the display device 1, the brightness of the display information comprised by the visible light passing through the infrared light cut-off portion 20 will be further maintained.

In the display device 1, the ultra-violet light cut-off layer 24 may be an adhesive layer. According to the display device 1, the ultra-violet light cut-off layer may be an adhesive layer, and therefore, the ultra-violet light can be effectively cut off, and the ultra-violet light cut-off layer 24 can be stacked to, for example, the infrared light cut-off layer 22 through its adhesiveness.

The adhesive layer comprises, for example, a benzophenone-based ultraviolet absorber, a salicylic acid-based ultraviolet absorber, a cyanoacrylate-based ultraviolet absorber, or a benzotriazole-based ultraviolet absorber. For example, the benzophenone-based ultraviolet absorber may comprise 2,4-dihydroxybenzophenone, 2-hydroxy-4-methoxybenzophenone, 2-hydroxy-4-dodecyloxy benzophenone, 2-hydroxy-4-methoxybenzophenone, 2,2'-dihydroxy-4-methoxybenzophenone, 2,2'-dihydroxy-4,4'-methoxybenzophenone, 2-hydroxy-4-methoxy-5-sulfone benzophenone, or bis(2-methoxy-4-hydroxy-5-benzoyl phenylmethane). For example, the salicylic acid-based ultraviolet absorber may comprise phenyl salicylate, p-tert-butylphenyl salicylate, and p-octylphenyl salicylate. For example, the cyanoacrylate-based ultraviolet absorber may comprise 2-ethylhexyl-2-cyano-3,3'-diphenylacrylate and ethyl-2-cyano-3,3'-diphenylacrylate. For example, the benzotriazole-based ultraviolet absorber may comprise 2-(2'-hydroxy-5'-methylphenyl) benzotriazole, 2-(2'-hydroxy-5'-tert-butylphenyl) benzotriazole, 2-(2'-hydroxy 3',5'-di-tert-butylphenyl) benzotriazole, 2-(2'-hydroxy-3'-tert-butyl-5'-methylphenyl)-5-chlorobenzotriazole, 2-(2'-hydroxy-3',5'di-tert-butylphenyl)-5-chlorobenzotriazole, 2-(2'-hydroxy-3', 5'-di-tert-aminophenyl) benzotriazole, 2-{2'-hydroxy-3'-(3", 4",5",6"-tetrahydrophthalimidemethyl)-5'-methylphenyl} benzotriazole, or 2,2-methylenebis{4-(1,1,3,3-tetramethyl-butyl)-6-(2H-benzotriazol-2-yl)phenol. Among these ultraviolet absorbers, the benzotriazole-based ultraviolet absorber is used preferably.

These ultraviolet absorbers are contained, for example, in a quantity ranging from 0.5 parts by mass to 30 parts by mass with respect to 100 parts by mass of the acrylic-based adhesive. The content of the ultraviolet absorber is 0.5 parts by mass or more, whereby the effect of suppressing transmission of ultraviolet rays can be improved. The content of the ultraviolet absorber is 30 parts by mass or less, whereby it can be uniformly dispersed in the acrylic-based adhesive, and the transparency in the visible light region can be further improved. These ultraviolet absorbers are more preferably contained, for example, in a quantity ranging from 1 part by mass to 10 parts by mass with respect to 100 parts by mass of the acrylic-based adhesive.

The thickness of the adhesive layer ranges, for example, from 1 μm to 500 μm, and preferably from 5 μm to 50 μm. By having a thickness in the range, the adhesive layer can obtain the required adhesive force more reliably, and can suppress an increase in cost.

As shown in FIG. 5, the infrared light cut-off portion 20 further comprises a hard coating 25 as desired. The infrared light reduction layer 23 may comprise a hard coat function. The hard coating 25 is provided, for example, below the lower surface 21b of the substrate 21. The hard coating 25 may be provided, for example, on an upper surface 23a of the infrared light reduction layer 23 as desired. The hard coating 25 may be provided, for example, both above the upper surface 23a of the infrared light reduction layer 23 and under the lower surface 21b of the substrate 21 as desired. The hard coating 25 can constitute at least one layer of the uppermost layer and the lowermost layer of the infrared light cut-off portion 20. Regardless of the configuration, the hard coating 25 can protect the infrared light cut-off portion 20. Moreover, the hard coating 25 can increase the mechanical strength of the infrared light cut-off portion 20.

The hard coating 25 comprises, for example, a binder and nanoparticles dispersed in the binder. The binder is, for example, a methacrylic oligomer and/or monomer, and the content of the binder is, for example, 5% to 60% by mass. The content of the nanoparticles in the binder is, for example, 40% to 95% by mass. Among the nanoparticles in the binder, 10% to 50% by mass of the nanoparticles (first nanoparticles) have, for example, particle diameters of 2 nm to 200 nm. Moreover, 50% to 90% by mass of the nanoparticles (second nanoparticles) have, for example, particle diameters of 60 nm to 400 nm. The ratio of the particle diameters of the nanoparticles to the particle diameters of the first nanoparticles is 2 to 200.

The hard coating 25 can be formed by a measuring coating method such as a wire bar method, a notch bar method, and a screen printing method.

According to the display device 1, the infrared light cut-off portion 20 may comprise the hard coating 25, and therefore, the mechanical strength of the infrared light cut-off portion 20 is increased, and the resistance to scratches and the like is increased.

Then, the relationship between the infrared light cut-off portion 20 and the visible light L2 of the linearly polarized wave incident to the infrared light cut-off portion 20 of the display device 1 of the present implementation is described with reference to FIG. 6. FIG. 6(*a*) is an illustrative view showing an orientation of the vibration direction PL1 of the visible light L2 incident to the infrared light cut-off portion 20. Moreover, FIG. 6(*b*) is an enlarged view showing the relationship between the vibration direction PL1 of the visible light L2 and the slow axis SA1 of the infrared light cut-off portion 20.

The infrared light cut-off portion 20 comprises the infrared light cut-off layer 22 consisting of the infrared light cut-off film 60, and the infrared light cut-off layer 22 has the slow axis SA1. The visible light L2 is a linearly polarized wave having the display information from the display portion 10, and the linearly polarized wave of the visible light L2 has the vibration direction PL1. The vibration direction PL1 of the visible light L2 incident to the infrared light cut-off portion 20 forms a certain angle, i.e., an angle TH1, with the slow axis SA1.

In a case where the vibration direction PL1 of the visible light L2 cannot be said to be generally parallel to the slow axis SA1, for example, in a case where the angle TH1 is about 45 degrees, the vibration direction PL1 of the linearly polarized wave of the visible light L2 is allowed to change. This is because, in the infrared light cut-off film 60, due to the one-dimensional molecular structure of the polymers contained therein, the refractive index in the direction along the slow axis SA1 is significantly different from the refractive index in the direction perpendicular to the slow axis SA1. The visible light L2 of the linearly polarized wave experiences both the refractive index in the direction of the slow axis SA1 and the refractive index in the direction perpendicular to the slow axis SA1. Due to these two different refractive indices, birefringence occurs in the infrared light cut-off portion 20 including the infrared light cut-off film 60. As a result, when the visible light L2 of the linearly polarized wave is transmitted from the infrared light cut-off portion 20, the linearly polarized wave of the visible light L2 may sometimes be changed into an elliptically polarized wave.

In contrast, in a case where the vibration direction PL1 of the visible light L2 is generally parallel to the slow axis SA1, that is, in a case where the angle TH1 is 0 degree or close to 0 degree, the vibration direction PL1 of the linearly polarized wave of the visible light L2 is not allowed to change, and the linearly polarized wave can be maintained. This is because the visible light L2 of the linearly polarized wave only experiences the refractive index in the direction generally along the slow axis SA1. It should be noted that when the angle TH1 is generally 90 degrees or close to 90 degrees, that is, when approximately perpendicular, the vibration direction PL1 of the linearly polarized wave of the visible light L2 is not allowed to change either. This is because the visible light L2 of the linearly polarized wave can only experience the refractive index in a direction generally perpendicular to the slow axis SA1.

Here, for example, it is assumed that a rotation center line RT1 coaxial with the vibration direction PL1 is taken as a central axis to rotate the infrared light cut-off portion 20, so that the incidence angle of the visible light L2 with respect to the infrared light cut-off portion 20 is changed. In the case, if the slow axis SA1 of the infrared light cut-off portion 20 is generally parallel to the vibration direction of the linearly polarized wave of the visible light L2, the linearly polarized wave of the visible light L2 can be maintained. This is because, even if the incidence angle is changed, the linearly polarized wave of the visible light L2 can continuously experience generally the same refractive index in the one-dimensional axial direction of the polymers in the infrared light cut-off portion 20, that is, along the slow axis SA1.

If further supplemented, when the vibration direction PL1 of the linearly polarized wave of the visible light L2 is generally perpendicular to the slow axis SA1 of the infrared light cut-off portion 20, if the incidence angle of the visible light L2 with respect to the infrared light cut-off portion 20 is changed, the linearly polarized wave of the visible light L2 cannot be maintained. This is because, in a case where the incidence angle is changed, the one-dimensional axial direction of the polymers in the infrared light cut-off portion 20 is changed to be different from the vibration direction PL1 of the visible light L2. Therefore, the linearly polarized wave of the visible light L2 causes optical rotation due to one-dimensional molecular structures of the polymers.

Figure 7B:
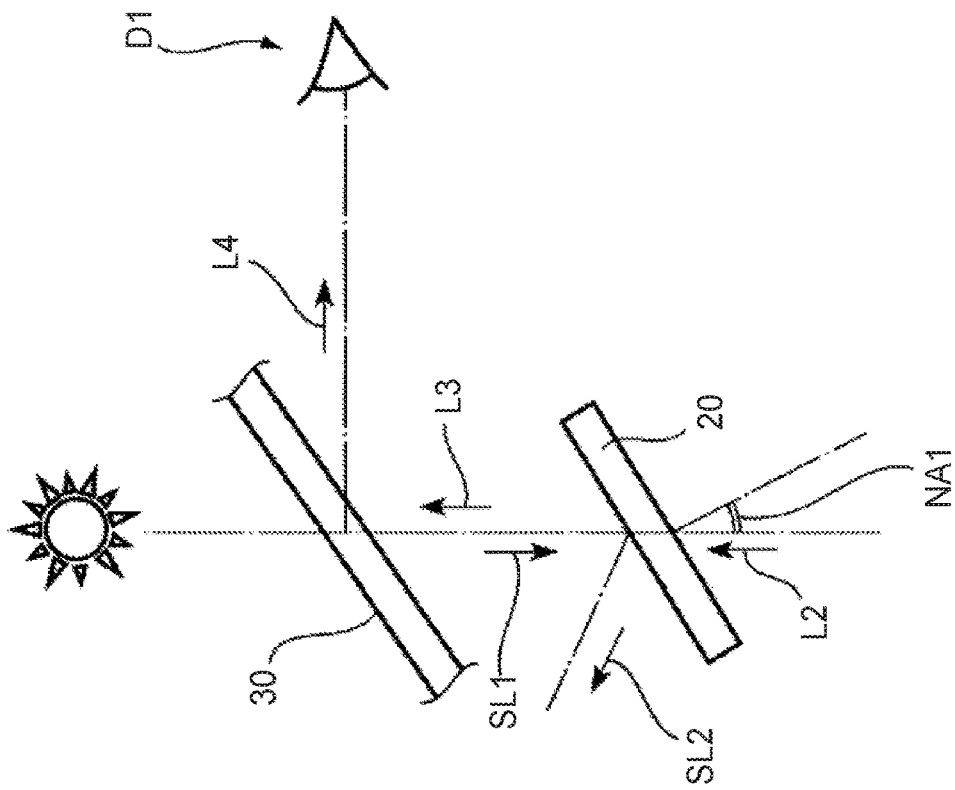
FIG. 7(b) is an illustrative view showing a state where an infrared light cut-off layer is configured in a manner that the visible light is incident at a specified incidence angle instead of being incident vertically.
Figure 7A:
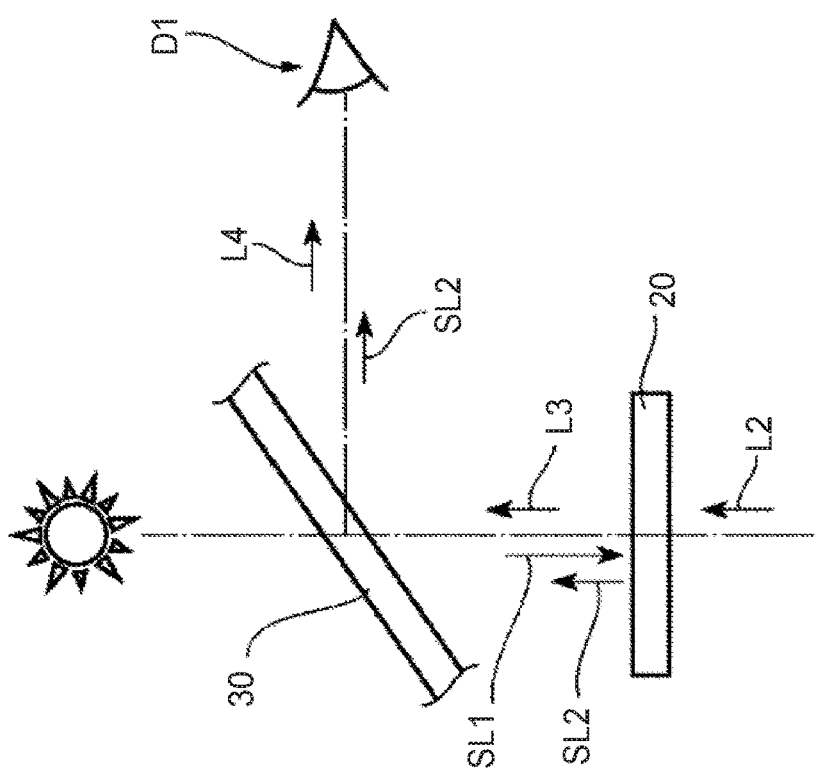
FIG. 7(a) is an illustrative view showing a state where an infrared light cut-off layer is configured in a manner that the visible light is incident vertically.

Then, with reference to FIG. 7, an incidence angle when the visible light L2 is incident to the infrared light cut-off portion 20 and influence thereof are described. FIG. 7(*a*) is an illustrative view showing a scheme in which the infrared light cut-off portion 20 is configured so that the incidence angle NA1 of the visible light L2 is 0 degree, that is, the light is incident vertically. Moreover, FIG. 7(*b*) is an illustrative view showing a scheme in which the infrared light cut-off portion 20 is configured such that the incidence angle NA1 of the visible light L2 is greater than 0 degree and less than 90 degrees, that is, a scheme in which the infrared light cut-off portion 20 is configured obliquely with respect to the visible light L2. Then, a reference method is assumed in FIG. 7(*a*), and the present implementation is assumed in FIG. 7(*b*).

The visible light L2 from the display portion 10 is incident to the infrared light cut-off portion 20, and a part of the incident visible light L2 is transmitted from the infrared light cut-off portion 20 to become the visible light L3. Moreover, an external light SL1 such as the sunlight is incident to the infrared light cut-off portion 20, and a part of the incident light SL1 is reflected by the infrared light cut-off portion 20 and becomes a reflected light SL2. It should be noted that, in FIG. 7(*a*) and FIG. 7(*b*), it is assumed that the external light SL1 and the visible light L2 are at the same light path timing.

As shown in FIG. 7(*a*), in a case where the visible light L2 is incident vertically to the infrared light cut-off portion 20, the reflected light SL2 of the sunlight and the like, that is, the reflected light SL2 generated by the external light SL1 reflected by the infrared light cut-off portion 20 has generally the same light path as that of the visible light L3 transmitted from the infrared light cut-off portion 20. As a result, the reflected light SL2 of the external light SL1 together with the visible light L3 proceeds towards eyes of the visual confirmer D1 such as the driver.

On the other hand, as shown in FIG. 7(*b*), the infrared light cut-off portion 20 according to the present implementation is configured obliquely with respect to the visible light L2, and the reflected light SL3 of the sunlight and the like has a light path different from that of the visible light L3 transmitted from the infrared light cut-off portion 20. That is, according to the display device 1 of the present implementation, it is easy to adjust an orientation of the infrared light cut-off portion 20 with respect to the light path of the visible light L2 so that a part of the external light SL1, after reflected by the infrared light cut-off portion 20, does not proceed towards the eyes of the visual confirmer D1 such as the driver.

As described above, according to the display device 1 of the present implementation, the infrared light cut-off layer 22 comprised in the infrared light cut-off portion 20 has the slow axis SA1, and the slow axis SA1 is generally parallel to the vibration direction PL1 of the linearly polarized wave. Therefore, compared with a scheme in which the slow axis SA1 is not generally parallel to the vibration direction PL1 of the linearly polarized wave, a ratio of changing the visible light L2 of the linearly polarized wave into the elliptical polarized wave after being transmitted from the infrared light cut-off portion 20 is reduced. As a result, a visual confirmer D1 such as a driver of a vehicle can easily recognize the display information comprised by the visible light L2 emitted from the display portion 10 as described above, and the visual confirmation of the display information will be maintained.

In the present implementation, the slow axis SA1 being generally parallel to the vibration direction PL1 of the linearly polarized wave of the visible light L2 may be defined as that: the angle TH1 formed by the slow axis SA1 and the vibration direction PL1 of the linearly polarized wave ranges from 0 degree to 10 degrees. As a supplement, the concept of "generally parallel" also comprises that the angle TH1 is 0 degree, that is, being parallel, and also comprises, for example, being substantially parallel with the angle TH1 ranges from 0 degree to 5 degrees.

According to the display device 1, after visible light from the display portion 10 is transmitted from the infrared light cut-off portion 20 including the infrared light cut-off layer 22, the ratio of changing the linearly polarized wave of the visible light L2 into the elliptically polarized wave is further reduced. As a result, a visual confirmer who recognizes the visible light L2 reflected by the reflecting portion 30 can recognize similar display information by the display information of the visible light emitted from the display portion.

In the present implementation, when the angle TH1 formed by the slow axis SA1 and the vibration direction PL1 of the linearly polarized wave ranges from 0 degree to 10 degrees, for example, for an infrared light cut-off film 60 having a generally rectangular two-dimensional shape, the maximum length as one side of the rectangle may be allowed to be up to 50 cm.

EMBODIMENTS

Hereinafter, the display device 1 is further described through embodiments of the present disclosure and comparative examples. The present disclosure is not limited to the following examples.

Embodiment 1

(Manufacturing of a Multi-Layer Infrared Light Cut-Off Film)

A multi-layer stretched polymer film including a polyester film is prepared, and a direction of a slow axis for the multi-layer stretched polymer film (3M™ Scotchtint™ window film multi-layer NANO80S, manufactured by 3M Japan Corporation) is measured. A phase difference measuring device KOBRA (manufactured by Oji Scientific Instruments Co., Ltd.) is used in the measurement of the direction of the slow axis. Based on the measurement result of the direction of the slow axis, the multi-layer infrared light cut-off film is cut out from a central region of the multi-layer stretched polymer film. The two-dimensional shape of the multi-layer infrared light cut-off film has long sides and short sides generally perpendicular to the long sides. The long side of the multi-layer infrared light cut-off film is generally parallel to the CD direction of the multi-layer stretched polymer film, that is, the direction of a first axis. In the present implementation, the length of the long side is set to 110 mm, and the length of the short side is set to 100 mm. Moreover, an angle formed by the direction of the slow axis and the direction of the long side of the cut film is 3.1 degrees or less.

(Manufacturing of an Infrared Light Cut-Off Portion)

In the present implementation, an infrared light cut-off portion comprising sequentially an ultra-violet light cut-off layer having an adhesive function, an infrared light cut-off layer, and an infrared light reduction layer having a hard coat function is manufactured. For the hard coating, a three-dimensionally crosslinked acrylic resin is used and adhered to a window portion via the ultra-violet light cut-off layer. For the window portion, polycarbonate having isotropy in an optical plane is used. The thickness of the window portion is set to 0.2 mm. For the ultra-violet light cut-off layer, an acrylic pressure-sensitive adhesive tape (PSA) is used. For the infrared light cut-off layer, a multi-layer infrared light cut-off film is used. The thickness of the multi-layer infrared light cut-off film is set to 50 μm. The infrared light reduction layer is made of antimony tin oxide (ATO) powder. The thickness of the infrared light reduction layer is set to 2 μm.

(Measurement of a Polarization State)

Figure 8B:
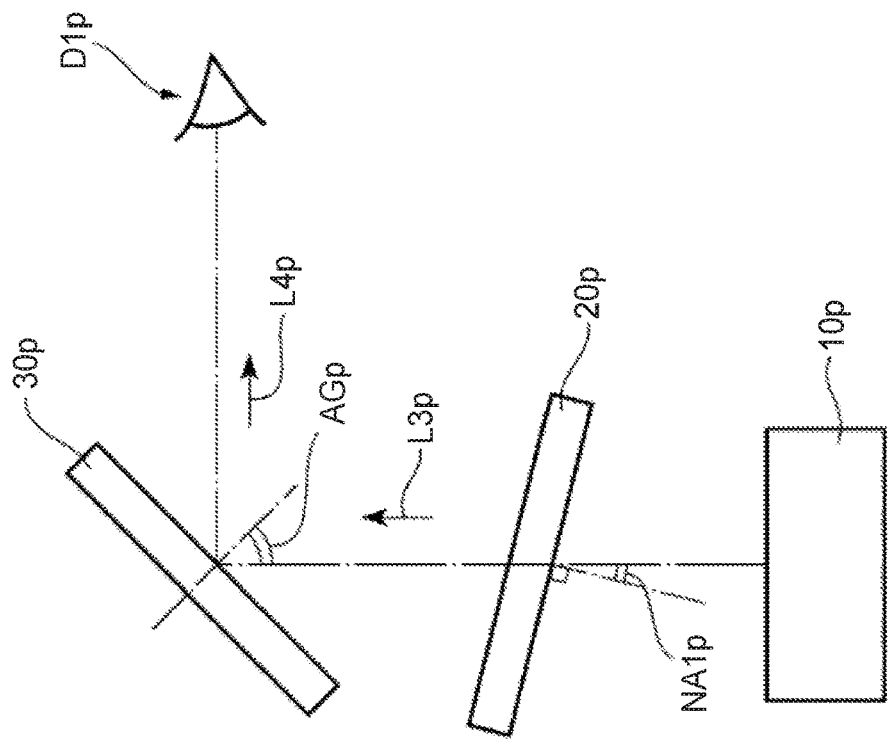
FIG. 8(a) and FIG. 8(b) are schematic views showing measurement systems that determine a polarization state of a visible light of a linearly polarized wave passing through the infrared light cut-off portion.
Figure 8A:
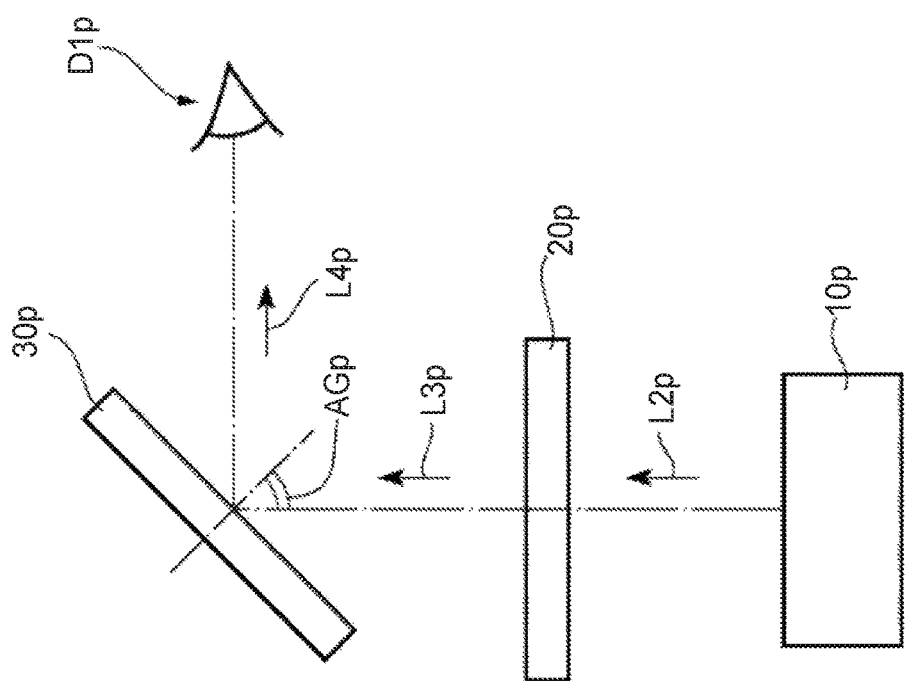

FIG. 8(a) and FIG. 8(b) are schematic views showing measurement systems that determine a polarization state of a visible light of a linearly polarized wave passing through the infrared light cut-off portion. In the measurement system, in FIG. 8(a) and FIG. 8(b), a white liquid crystal display that emits the linearly polarized wave is used as the display portion 10p, and float plate glass FG is used as the reflecting portion 30p. Visible light L2p from the display portion 10p comprises display information. The float plate glass FG is generally transparent in the visible light region, and its thickness is about 5 mm. An incidence angle AGp of the visible light L2p to the reflecting portion 30p is about 45 degrees. In the configurations shown in FIG. 8(a) and FIG. 8(b), in a position equivalent to the driver, a measurer D1p can observe the reflecting portion 30p by visual inspection on the front side thereof.

In the present embodiment, the visible light L2p of the linearly polarized wave is emitted from the display portion 10p towards the infrared light cut-off portion 20p. The polarization direction of the emitted visible light L2p is generally along the long side of the infrared light cut-off portion 20p, and a slow axis of the infrared light cut-off portion 20p is set to be generally parallel to the vibration direction of the linearly polarized wave of the visible light L2p. Specifically, an angle TH1p formed by the slow axis of the infrared light cut-off portion 20p and the vibration direction of the linearly polarized wave of the visible light L2p is 0 degree on the average of the entire infrared light cut-off portion 20p.

FIG. 8(a) is a view showing a measurement system in which the visible light is incident vertically to the infrared light cut-off portion 20p, and FIG. 8(b) is a view showing a measurement system in which the visible light is incident to the infrared light cut-off portion 20p at an incidence angle NA1p. In the present embodiment, the polarization state is measured using both the measurement systems of FIG. 8(a) and FIG. 8(b). In the measurement system of FIG. 8(b), the incidence angle NA1p is set to 17 degrees. The measurement system of FIG. 8(a) corresponds to the measurement system of FIG. 7(b) when the incidence angle NA1p of the visible light L2p in the measurement system is 0 degree.

In the present embodiment, the measurement systems shown in FIG. 8(a) and FIG. 8(b) are used to observe the polarization state of the visible light L4p of the linearly polarized wave passing through the infrared light cut-off portion 20p. When it is observed by the measurer D1p that the visible light L4p reflected by the float plate glass FG comprises display information of which the degree of coloration cannot be confirmed, it is evaluated as "A (good)." When it is observed by the measurer D1p that the visible light L4 comprises colored display information such as an iridescent rainbow pattern, it is evaluated as "B (poor)."

Figure 9A:
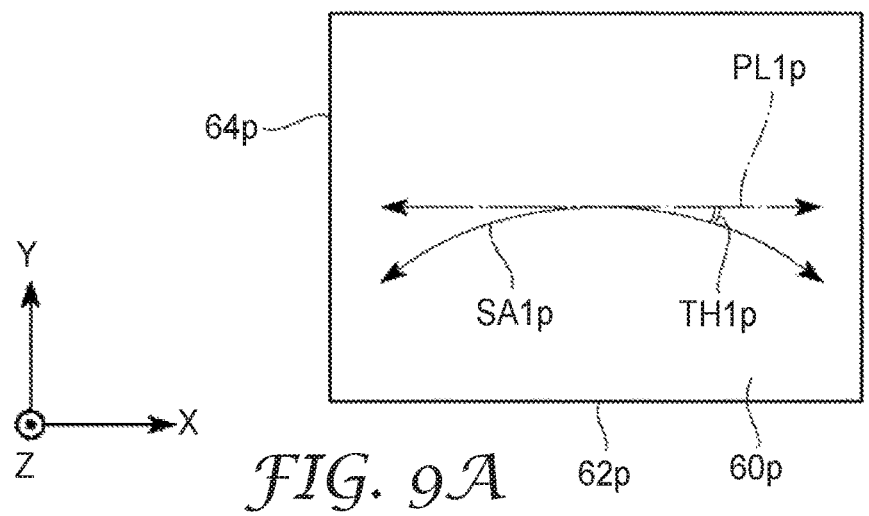
FIG. 9(a) is an enlarged view showing a relationship between the slow axis of the infrared light cut-off film and the vibration direction of the visible light in Embodiment 1.

FIG. 9(a) is an enlarged view showing a relationship between the slow axis SA1p of the infrared light cut-off film 60p and the vibration direction PL1p of the visible light L2 in the present embodiment. The infrared light cut-off film 60p according to the present embodiment is cut out from the central region of the stretched polymer film, and its long side 62p is generally parallel to the CD direction of the stretched polymer film 50. In the present embodiment, an average value of the angle TH1p formed by the direction of the slow axis SA1p and the vibration direction PL1p of the incident visible light L2 is 0 degree.

Comparative Example 1

(Manufacturing of a Multi-Layer Infrared Light Cut-Off Film)

In the present comparative example, a multi-layer stretched polymer film is prepared in the same manner as in Embodiment 1, and a multi-layer infrared light cut-off film is cut out from a central region of the multi-layer stretched polymer film. The two-dimensional shape of the multi-layer infrared light cut-off film of this comparative example has long sides and short sides generally perpendicular to the long sides. The long side of the multi-layer infrared light cut-off film is set to be generally parallel to the MD direction of the multi-layer stretched polymer film.

(Measurement of a Polarization State)

In this comparative example, the polarization state of the visible light L4p of the linearly polarized wave passing through the infrared light cut-off portion 20p is observed in the same manner as in Embodiment 1. In this comparative example, the visible light L2p of the linearly polarized wave is emitted from the display portion 10p towards the infrared light cut-off portion 20p. The polarization direction of the emitted visible light L2p is generally parallel to the long side of the infrared light cut-off portion 20p, and the slow axis of the infrared light cut-off portion 20p is set to be generally perpendicular to the vibration direction of the linearly polarized wave of the visible light L2p. Specifically, an angle formed by the slow axis of the infrared light cut-off portion 20p and the vibration direction of the linearly polarized wave of the visible light L2p is 90 degrees on the average of the entire infrared light cut-off portion 20p.

Figure 9B:
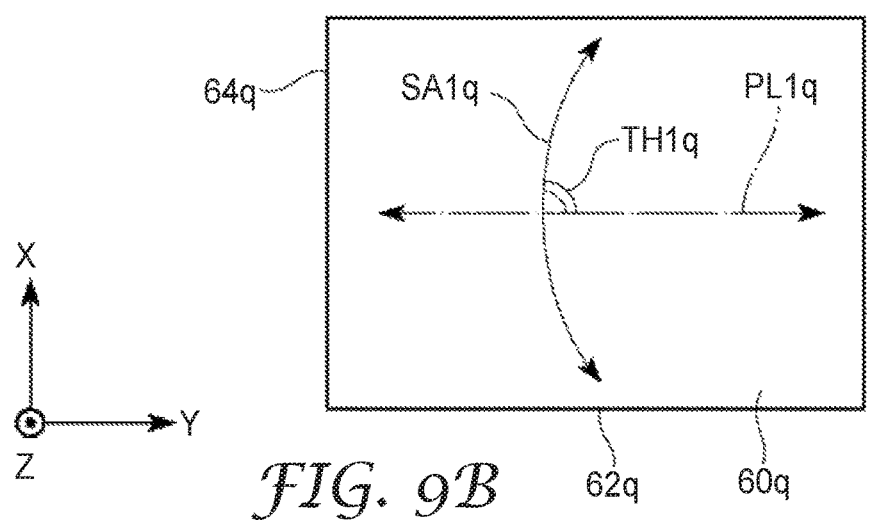
FIG. 9(b) is an enlarged view showing a relationship between the slow axis of the infrared light cut-off film and the vibration direction of the visible light in Comparative Example 1.

FIG. 9(b) is an enlarged view showing a relationship between the slow axis SA1q of the infrared light cut-off film 60q and the vibration direction PL1q of the visible light L2 in this comparative example. In this comparative example, an average value of the angle TH1q formed by the direction of the slow axis SA1q and the vibration direction PL1q of the incident visible light L2 is 90 degrees.

Comparative Example 2

(Manufacturing of an Infrared Light Cut-Off Film)

A multi-layer stretched polymer film comprising a polyester film is prepared. In this comparative example, an infrared light cut-off film is cut out from a peripheral region of the multi-layer stretched polymer film, and the two-dimensional shape of the infrared light cut-off film is set to be a generally rectangle having long sides and short sides generally perpendicular to the long sides. In this comparative example, the length of the long side is set to 110 mm, and the length of the short side is set to 100 mm.

In this comparative example, the infrared light cut-off film is cut in a manner that the long side is in the MD direction. The short side of the infrared light cut-off film of this comparative example is generally parallel to the CD direction, i.e., the direction of a first axis. An angle formed by the direction of the slow axis and the direction of the long side of the cut film is 70 degrees.

(Manufacturing of an Infrared Light Cut-Off Portion)

In addition to the usage of the multi-layer infrared light cut-off film manufactured in this comparative example, an infrared light cut-off portion is manufactured in the same manner as in Embodiment 1. The thickness of the multi-layer infrared light cut-off film is set to 50 μm.

(Measurement of a Polarization State)

In this comparative example, the polarization state of the visible light L4p of the linearly polarized wave passing through the infrared light cut-off portion 20p is observed in the same manner as in Embodiment 1.

In this comparative example, the visible light L2p of the linearly polarized wave is emitted from the display portion 10p towards the infrared light cut-off portion 20p. The polarization direction of the emitted visible light L2p is generally parallel to the long side of the infrared light cut-off portion 20p. The angle formed by the slow axis of the infrared light cut-off portion 20p and the vibration direction of the linearly polarized wave of the visible light L2p is 70 degrees on the average of the entire infrared light cut-off portion 20p.

Figure 9C:
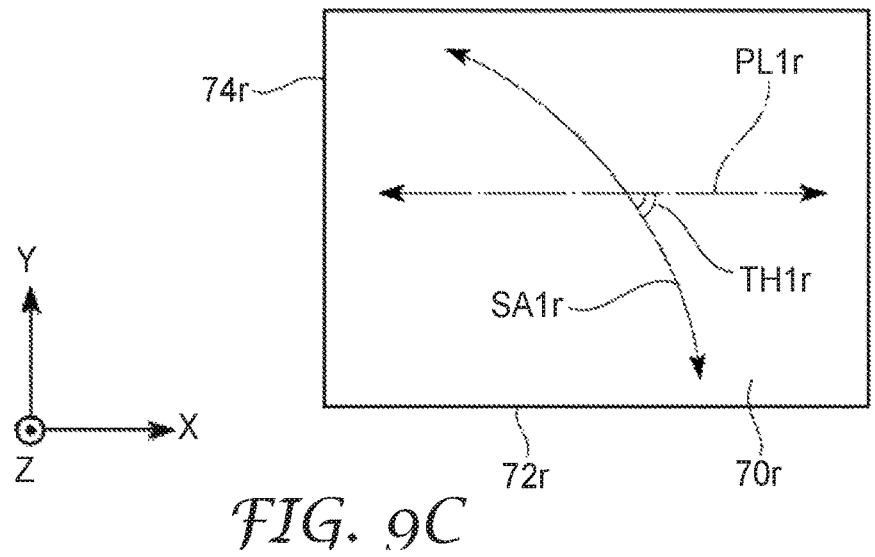
FIG. 9(c) is an enlarged view showing a relationship between the slow axis of the infrared light cut-off film and the vibration direction of the visible light in Comparative Example 2.

FIG. 9(c) is an enlarged view showing a relationship between the slow axis SA1r of the infrared light cut-off film 70r and the vibration direction PL1r of the visible light L2 in this comparative example. In this comparative example, an average value of the angle TH1r formed by the direction of the slow axis SA1r and the vibration direction PL1r of the incident visible light L2 is 70 degrees.

Table 1 is a table which summarizes measurement results of the infrared light cut-off layer, the direction of the slow axis, and the polarization state of Embodiment 1, Comparative Example 1, and Comparative Example 2. In Embodiment 1 and Comparative Example 1 in Table 1, the "stretched film" indicates that their infrared light cut-off portion comprises an infrared light cut-off layer made of a stretched polymer film. In Comparative Example 2 in Table 1, the "stretched film/non-stretched film" indicates that the infrared light cut-off portion of Comparative Example 2 comprises an infrared light cut-off layer formed by overlapping an infrared light cut-off portion preparation body of Comparative Example 2 on a lamination body over the infrared light cut-off portion of Embodiment 1. In Table 1, the "formed angle (average)" indicates an average of the angle formed by the slow axis of the infrared light cut-off portion and the vibration direction of the linearly polarized wave of the visible light. In Table 1, the "incident vertically" indicates a measurement result of the polarization state using the measurement system of FIG. 8(a), and the "incident obliquely" indicates a measurement result of the polarization state using the measurement system of FIG. 8 (b).

TABLE 1

| | Infrared light cut-off portion | Formed angle (average) | Evaluation of the polarization state | |
|---|---|---|---|---|
| | | | Incident Vertically | Incident Obliquely |
| Embodiment 1 | Stretched film (central region) | 0 degree | A | A |
| Comparative Example 1 | Stretched film (central region) | 90 degrees | A | B |
| Comparative Example 2 | Stretched film (peripheral region) | 70 degrees | B | B |

What is claimed is:

1. A display device, characterized in that the display device comprises:
   a display portion emitting a visible light of a linearly polarized wave having display information;
   an infrared light cut-off portion transmitting the visible light from the display portion and reducing an incident amount of an infrared light to the display portion; and
   a reflecting portion reflecting the visible light transmitted through the infrared light cut-off portion,
   wherein the infrared light cut-off portion comprises an infrared light cut-off layer,
   the infrared light cut-off layer has a slow axis, and
   the slow axis is generally parallel to a vibration direction of the linearly polarized wave.

2. The display device according to claim 1, wherein the term "generally parallel" means that an angle formed by the slow axis and the vibration direction of the linearly polarized wave is greater than 0 degree and less than 10 degrees.

3. The display device according to claim 1, wherein an incidence angle of the linearly polarized wave with respect to the infrared light cut-off portion is greater than 0 degree and less than 90 degrees.

4. The display device according to claim 1, wherein the infrared light cut-off portion further comprises an ultra-violet light cut-off layer reducing a transmittance of an ultra-violet light, and
   the infrared light cut-off layer and the ultra-violet light cut-off layer both have transmissivity in a visible light region.

5. The display device according to claim 4, wherein the transmissivity has a transmittance greater than 60% in the visible light region.

6. The display device according to claim 4, wherein the infrared light cut-off portion comprises a hard coating.

7. The display device according to claim 4, wherein the ultra-violet light cut-off layer is an adhesive layer.

8. The display device according to claim 1, wherein the display device further comprises a window portion assembled on an opening provided in an instrument board of a vehicle, and disposed between the display portion and the reflecting portion on a light path of the visible light, and
   the infrared light cut-off portion is provided between the window portion and the reflecting portion.

9. The display device according to claim 1, wherein the display device further comprises a window portion assembled on an opening provided in an instrument board of a vehicle, and disposed between the display portion and the reflecting portion on a light path of the visible light, and the infrared light cut-off portion is provided between the display portion and the window portion.

* * * * *